United States Patent
Rozman et al.

(10) Patent No.: US 11,228,344 B2
(45) Date of Patent: Jan. 18, 2022

(54) LOW POWER MODE CARD DETECTION

(71) Applicant: STMicroelectronics razvoj polprevodnikov d.o.o., Ljubljana (SI)

(72) Inventors: Jernej Rozman, Ravne Na Koroskem (SI); Tilen Svete, Preserje (SI)

(73) Assignee: STMICROELECTRONICS RAZVOJ POLPREVODNIKOV D.O.O., Ljubljana (SI)

( * ) Notice: Subject to any disclaimer, the term of this patent is extended or adjusted under 35 U.S.C. 154(b) by 67 days.

(21) Appl. No.: 16/702,902

(22) Filed: Dec. 4, 2019

(65) Prior Publication Data

US 2020/0204215 A1 Jun. 25, 2020

(30) Foreign Application Priority Data

Dec. 19, 2018 (EP) .................................... 18213835

(51) Int. Cl.
*H04B 5/00* (2006.01)

(52) U.S. Cl.
CPC ......... *H04B 5/0062* (2013.01); *H04B 5/0068* (2013.01)

(58) Field of Classification Search
CPC .... H04B 1/126; H04B 1/10; H04B 2001/305; H04B 1/12; H04B 1/123; H04B 5/0062; H04B 5/0068
See application file for complete search history.

(56) References Cited

U.S. PATENT DOCUMENTS

| | | | |
|---|---|---|---|
| 2006/0199558 A1* | 9/2006 | Chiodini | H04B 1/7075 455/234.1 |
| 2008/0238622 A1 | 10/2008 | Rofougaran et al. | |
| 2013/0063305 A1* | 3/2013 | Lo | H03L 1/027 342/357.62 |
| 2014/0062588 A1* | 3/2014 | Gopalan | H04B 5/0056 329/304 |
| 2014/0256270 A1* | 9/2014 | Cho | H04B 5/02 455/77 |
| 2018/0212635 A1 | 7/2018 | Wicaksana et al. | |
| 2020/0204215 A1 | 6/2020 | Rozman et al. | |

FOREIGN PATENT DOCUMENTS

| | | |
|---|---|---|
| CN | 106339732 A | 1/2017 |
| CN | 107079233 A | 8/2017 |
| CN | 210839568 U | 6/2020 |
| EP | 1035691 A2 | 9/2000 |
| EP | 3190539 A1 | 7/2017 |

* cited by examiner

Primary Examiner — Nhan T Le
(74) Attorney, Agent, or Firm — Slater Matsil, LLP

(57) ABSTRACT

A circuit includes an in-phase/quadrature down converter configured to be coupled to an antenna of a first NFC (near field communication) device. DC cancellation circuitry is coupled at outputs of the converter. Detection circuitry is configured to analyze DC signals output by the DC cancellation circuits to detect the presence of a second NFC device.

21 Claims, 4 Drawing Sheets

LOW POWER MODE CARD DETECTION

CROSS-REFERENCE TO RELATED APPLICATIONS

This application claims priority to European Patent Application No. 18213835.4, filed on Dec. 19, 2018, which application is hereby incorporated herein by reference.

TECHNICAL FIELD

The present description relates generally to electronic circuits and, in particular embodiments, to a method and device for detecting a near filed communication device.

BACKGROUND

Communication systems with electromagnetic transponders are increasingly commonplace, since the development of near field communication (NFC) technologies.

These systems make use of a radiofrequency electromagnetic field generated by one device (e.g., a terminal unit or reader) to communicate with another device (e.g., a card).

In recent systems, one and the same NFC device can operate in card mode or in reader mode (for example, in the case of near field communication between two mobile phones). It is then commonplace for such NFC devices to be powered by batteries, and for their functions and circuits to be placed on standby, or on low power mode, to reduce the energy consumption between periods of use. The devices may subsequently be "woken up" (e.g. brought out of standby) when they are within range of one another.

SUMMARY

The present description relates generally to electronic circuits and, in particular embodiments, electromagnetic transponders or electronic tags. Embodiments relate to electronic devices incorporating a near field communication (NFC) circuit and to detecting the presence of such a device in the field of another device.

Embodiments can reduce all or some of the drawbacks of the known techniques for detecting the presence of an electronic device incorporating a near field communication circuit by another electronic device emitting an electromagnetic field.

Embodiments provide a solution that avoids detection errors.

Thus, an embodiment provides a circuit comprising an In-phase Quadrature down converter capable of being coupled to an antenna of a first NFC device, DC cancellation circuits coupled at outputs of the converter, and circuitry for analyzing DC signals outputted by the DC cancellation circuits to detect the presence of a second NFC device.

According to an embodiment, the circuit further comprises low pass filters between the IQ down converter and the DC cancellation circuits.

According to an embodiment, the DC cancellation circuits are configured by the circuitry, based on DC levels measured when no second NFC device is present in a field generated by the first NFC device.

According to an embodiment, the circuitry comprises amplifiers of the DC signals, an analog to digital converter of signals outputted by the amplifiers, and a processing unit of digital signals provided by the analog to digital converter and representative of the phase and amplitude of a variation of a RF signal sensed by the antenna.

According to an embodiment, the circuitry includes a chopping circuit coupled to the DC cancellation circuitry and configured to receive DC signals from the DC cancellation circuitry. The circuitry further includes a reader/writer receiver of the first NFC device.

According to an embodiment, a frequency of the chopping circuit corresponds to a frequency of filters of the reader/writer receiver.

An embodiment concerns a method comprising a step of emission of an electromagnetic field by a first NFC device, a step of conversion in-phase and quadrature of a RF signal sensed by an antenna, a step of DC cancellation, and a step of analyzing DC signals resulting of the DC cancellation to detect the presence of a second NFC device.

According to an embodiment, the method further comprises a step of low pass filtering of signals resulting of the in-phase and quadrature conversion.

According to an embodiment, the DC cancellation removes DC levels measured when no second NFC device is present in the field.

According to an embodiment, the step of analyzing is performed by a receiver (60) of the first NFC device.

According to an embodiment, the steps are performed periodically, for a short time compared to the period.

According to an embodiment, the first NFC device is in a standby mode between two successive emission periods.

According to an embodiment, the method further comprises initiating, by the first NFC device, a near field communication with the second NFC device in response to a detection of the presence of the second NFC device in a range of the first NFC device.

An embodiment provides near field communication device that comprises a resonant circuit configured to generate an electromagnetic, a field detection circuit configured to detect a change in a phase and/or an amplitude of the electromagnetic field, a processor, and a computer-readable storage medium storing a program to be executed by the processor, the program including instructions for implementing the described method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radiofrequency signals and their interpretation have not been detailed, the embodiments described being compatible with the standard techniques for generating and interpreting these signals.

Unless indicated otherwise, when reference is made to two elements connected together, this signifies a direct connection without any intermediate elements other than conductors, and when reference is made to two elements linked or coupled together, this signifies that these two elements can be connected, or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
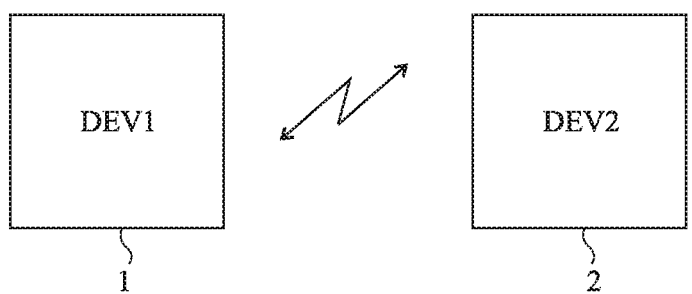
FIG. 1 is a very simplified representation in the form of blocks of an example of a near-field communication system of the type to which the embodiments which will be described apply as an example illustrates.

FIG. 1 is a very simplified representation in the form of blocks of an example of a near-field communication system of the type to which the embodiments which will be described apply as an example.

Although the case of two similar electronic devices, for example, two cellular phones, is assumed, all that will be described more generally applies to any system where a transponder detects an electromagnetic field radiated by a reader or terminal. For simplification, reference will be made to NFC devices to designate electronic devices integrating near-field communication circuits.

The near field communication system of FIG. 1 includes two NFC devices 1 (DEV1) and 2 (DEV2) that are capable of communicating with each other by near field electromagnetic coupling. Depending on the applications, for a communication between devices 1 and 2, one of the devices operates in so-called reader mode while the other operates in so-called card mode, or both devices communicate in peer to peer (P2P) mode. Each device includes various electronic circuits for generating a radiofrequency signal, which may be transmitted using an antenna. The radiofrequency field generated by one of the devices is picked up by the other device which is located in range and which also includes an antenna.

A NFC device comprises an oscillating or resonating circuit formed of an antenna (inductive element) and of a capacitive element to detect an electromagnetic field. The voltage recovered across the resonant circuit is processed by electronic circuits of the device or transponder, in some cases to extract the power necessary to its operation, and more generally to decode information transmitted via a modulation of the electromagnetic field, etc.

The oscillating circuits of NFC devices are generally tuned to a same nominal resonance frequency, for example, 13.56 MHz. A communication in the direction from the reader (generating the field) to card is performed by modulating the amplitude and/or the phase of the carrier at 13.56 MHz. A communication in the card to reader direction is generally performed by modulating the load (retro-modulation or back-modulation) formed by the card circuits on the field radiated by the reader, the latter interpreting this load variation.

In the applications more particularly targeted by the present description, when an NFC device is not currently communicating, it is switched to standby mode, or low power mode, in order to reduce energy consumption. That is in particular the case for battery-powered devices.

When one device (for example, the device 1) emits an electromagnetic field to initiate a communication with another NFC device (for example, the device 2), the field is picked up (e.g., detected) by this device 2 as soon as it is located in range. This field is detected by the circuits of the device 2 which, if they are on standby, are reactivated. That is reflected in a variation of the load of the circuits of the device 2 on the resonant circuit for generating the field of the device 1. In practice, the corresponding variation of phase and/or of amplitude of the field emitted is detected by the device 1 which then begins an NFC communication protocol with the device 2. On the device 1 side, the amplitude of the voltage at the terminals of the resonant circuit dropping below a threshold or a phase shift above a threshold is in practice detected.

Once the device 1 has detected the presence of the device 2 within its field, it begins a communication setup procedure, implementing transmissions of requests by the device 1 and of responses by the device 2.

In the applications of NFC devices with low consumption placed in standby mode, these devices periodically activate their NFC circuits to emit a field for a short time (for example a few microseconds) compared to the period between two activations (i.e., the time between successive field emissions), in order to detect whether another device is in range.

The rest of the description considers the case of a device 1 acting as a reader or terminal and of a device 2 acting as a card or tag. The reader 1 is in low power mode and should be woken-up once a card 2 is detected. Hence, the field is generated by device 1, which detects the presence of a card by analyzing the variations of the amplitude and/or phase of the generated field, which are indicative of the presence of a card loading the field emitted by the reader.

One difficulty lies in the fact that the variation of the amplitude of the field or of its phase on the reader 1 side depends, amongst others, on the coupling made with the card 2. The coupling factor depends on several parameters, including the distance between the two devices and the size of the antenna of the card 2.

Also, the variation of the load, on the electromagnetic field generated by the reader 1, due to the presence of the card 2, can be polluted by various noises, in particular by DC noise, on the reader side.

Low power mode card detection circuits include In-phase Quadrature downconverters (IQ downconverters) associated with low pass filters, which convert an input RF signal into two DC signals, respectively indicative of the amplitude and of the phase of the input signal. These DC signals are then compared to thresholds in order to detect a change of the load of the oscillating circuit indicative of the presence of a card. The down processing is generally digital.

One difficulty of such a detection is that the DC signals at the outputs of the low pass filter are generally polluted by DC noise, the amplitude of which can be non-negligible compared to the variation due to the presence of a card.

Figure 2:
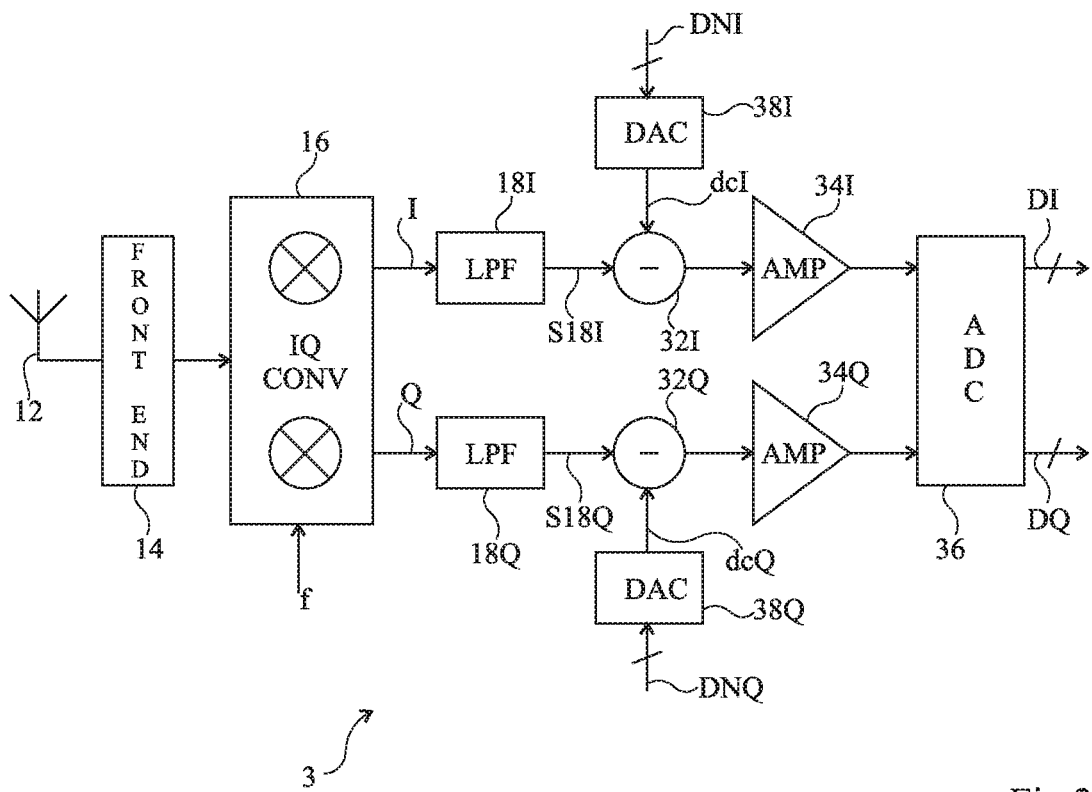
FIG. 2 schematically represents a low power mode card detection circuit according to one embodiment.

FIG. 2 schematically represents a low power mode card detection circuit 3 according to one embodiment.

The circuit 3 of FIG. 2 is partial and only represents the elements which are used for the card detection, other elements are of course present in a NFC device acting as a card but are not modified by the solutions presented in the present description. In particular, the part of the device generating the electromagnetic field is not represented, only the receiving part or section being represented.

The RF signal, received by an antenna 12, is applied at an input of an In-phase Quadrature downconverters or IQ down converter 16 (IQ CONV) receiving a frequency f, which corresponds to the nominal frequency of the carrier of the RF signal (e.g. 13.56 MHz). In most cases, front-end circuits 14 (FRONT END) are provided between antenna 12 and converter 16. These circuits 14 include, depending on the application, matching network(s), splitting circuits (in case antenna 12 is common to transmitting and receiving parts), filters, etc.

The IQ converter 16 provides on two outputs, I and Q DC signals representative of the phase and amplitude of the RF signal. These two signals I and Q are filtered, by low pass filters (LPF) 18I and 18Q, respectively to obtain DC signals or DC levels representative of the phase and amplitude of the RF signals.

According to the disclosed embodiments, the DC signals S18I and S18Q provided by filters 18I and 18Q, respectively, are inputted to subtractors 32I and 32Q of a DC level DCI and DCQ, respectively. The DC levels DCI and DCQ correspond to levels provided by filters 18I and 18q, respectively, when no card is present. Doing so, in normal operation, the respective outputs of subtractors 32I and 23Q provide a level which corresponds to the actual phase and amplitude of the useful signal.

Eliminating the DC static or DC noise component allows to amplify the useful signals or DC levels by amplifiers (AMP) 34I and 34Q before submitting these levels to analog to digital converters 36 (ADC). ADC 36 provides two digital signals DI and DQ representative of the phase and amplitude of the variation of the RF signal (possibly loaded by a card) with respect to the RF signal generated by the reader.

The amplification of the useful levels, which are representative of the phase variation and of the amplitude variation, considerably improves the detection of a card and the switching, without error, of the reader in an active mode.

Such amplification is not possible in previous solutions because of the DC noise, which can bring the amplifier at saturation and renders any measure uninterpretable.

Preferably, subtractors 32I and 32Q receive the information about the DC standby levels DCI and DCQ from digital to analog converters (DAC) 38I and 38Q respectively. DACs 38I and 38Q receive setpoints in the form of digital words DNI and DNQ, receptively.

In practice, each analog subtractor 32I or 32Q can be made of an operational amplifier, mounted in subtractor, the inverted input of which receives the corresponding standby DC level.

The standby setpoints DNI and DNQ are obtained during a calibrating phase, before evaluating the presence of a card in the field of the reader. Such a calibrating phase can be done at the initialization of the reader, at each powering on, before each switching to the low power mode, periodically, etc., depending on the application and of the environment constraints.

Figure 3:
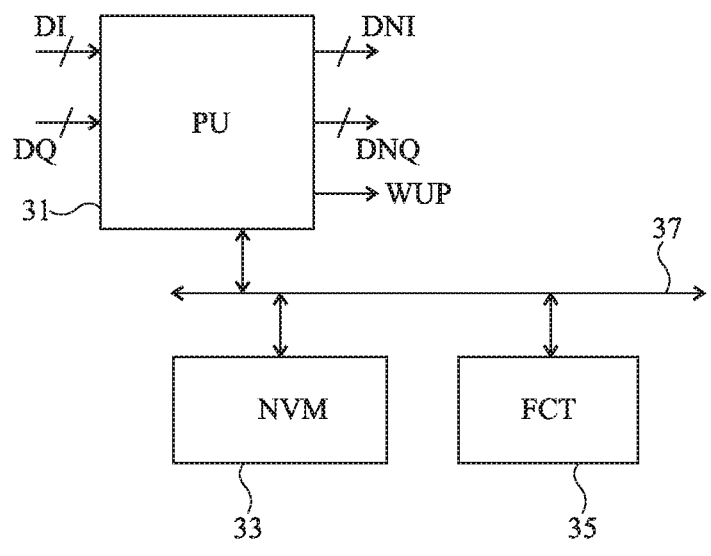
FIG. 3 represents, very schematically, digital circuitry of a NFC device according to an embodiment.

FIG. 3 represents, very schematically, a digital circuitry of a NFC device according to an embodiment.

A NFC device comprises, amongst others, a digital processing unit 31 (PU) configured to control the field emission (not shown) and to interpret the digital levels DI and DQ provided by the converter 36. According to the embodiment represented in FIG. 3, the processing unit 31 provides the digital setpoints DNI and DNQ to the digital to analog converters 38I and 38Q, respectively, and processes the digital levels DI and DQ in order to detect a card in the field of the reader. Once a card is detected, the processing unit 31 issues a wake-up signal WU to indicate to the reader that a card is present and that the reader should start a communication.

Schematically, the operation of the processing unit is controlled by a program stored in a nonvolatile memory 33 (NVM) and communicate with this memory and other functions of the reader (symbolized by a block 35 (FCT)) by one of several buses 37 of control and/or data and/or addresses. Digital words to and from the detection circuit 3 can be directly applied by dedicated inputs and issued by dedicated outputs of unit 31 but can also be carried by the buses 37.

Figure 4:
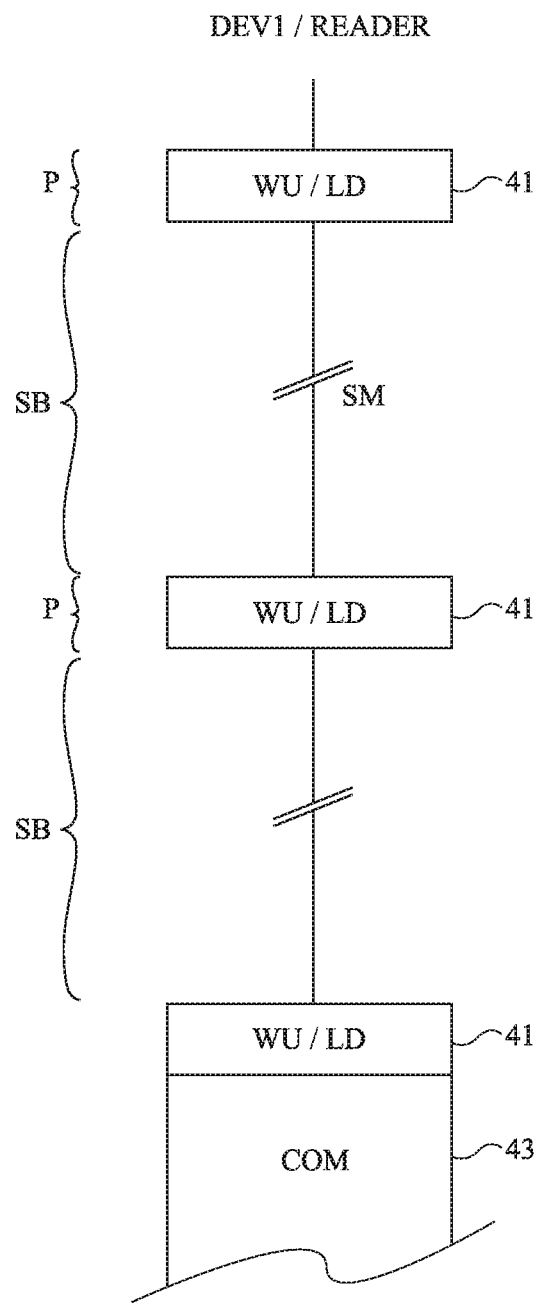
FIG. 4 schematically shows steps of a method for detecting the presence of an NFC device.

FIG. 4 schematically shows steps of a method for detecting the presence of an NFC device.

The case is considered of an NFC (reader) device (for example, device 1) which is periodically woken up (block 41, WU/LD) to emit a field for a relatively short period of time P compared to the time SB between two emission periods P, in order to detect the presence of another (card) NFC device (for example, device 2) in range. Between two emission/detection periods P, the device DEV1 or reader is in standby mode SM.

During the time period where the reader emits the field, the detection circuit 3 (FIG. 2) is activated.

If no card 2 is detected, i.e. is the digital levels DI and DQ are interpreted as not showing the presence of the card, the rest of the circuits of the reader stays in low power mode and the field emission stops until the next period P.

Assuming that a card 2 is in range and that the field emitted by the reader 1 is sufficient to activate a field detector of the card 2, the card is woken up. The variation of the load of the circuits of the card 2 on the oscillating circuit of the device 1 is then interpreted by the detection circuit 3. If the coupling is good enough, the variations of phase and/or of amplitude is/are detected as sufficient and the reader starts a communication (bloc 43, COM).

The communication itself is not impacted by the implementation of the detection disclosed in the present description.

Different solutions can be implemented to determine the setpoints DNI and DNQ.

According to an embodiment, more particularly directed to applications where the reader is located in a non-perturbating environment, the setpoints are determined at the manufacturing and are set based on measurement of the digital levels obtained during a test procedure.

Preferably, the setpoints are determined, in real operating conditions, in order to take into account the environment of the reader. In such a case, an iterative calibrating process is carried out starting from a setpoint at a null value (with no impact on the signal S18I and S18d, respectively) progressively incremented until the outputs of the amplifiers 34I and 34Q show a zero value. The number of steps depends on the resolution (number of bits, for example 6 bits) of the digital to analog converters 38I and 38Q, which is not necessarily the same as the resolution (number of bits, for example 8) of the analog to digital converter 36. Once the detection circuit 3 is calibrated, it can be put in operation and any variation of the phase and amplitude will be detected with more accuracy as it becomes possible to amplify the useful signal.

The determination of the setpoints is preferably carried out every time that the reader is placed in low power detection mode. Indeed, when the reader is placed in low power detection mode, this corresponds to a situation where no card is in the field of the reader. Furthermore, doing this at each occurrence improves the reliability of the measures as it takes into account variations of the environment of the reader.

Figure 5:
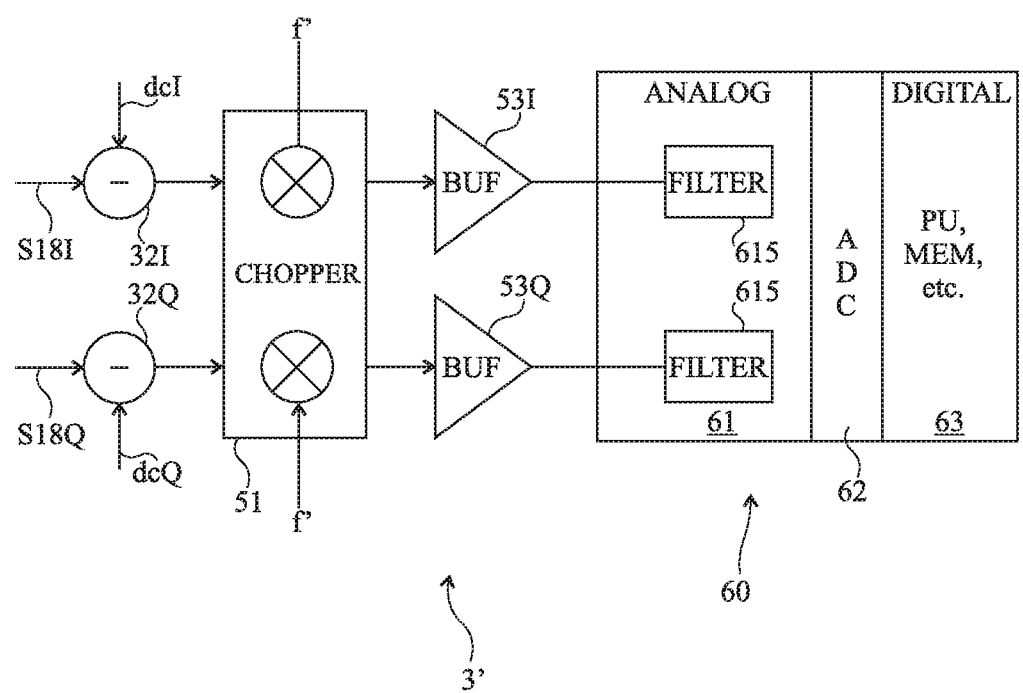
FIG. 5 represents, very schematically and with blocks, an alternative embodiment of a low power mode card detector.

FIG. 5 represents, very schematically and with blocks, an alternative embodiment of a low power mode card detector 3'.

According to this embodiment, the outputs of the subtractors 32I and 32Q are applied to a chopper circuit(s) or amplifier(s) 51 converting the DC levels issued by the subtractors 32I and 32Q into analog signals of frequency f. Preferably, frequency f corresponds to the frequency used by the card to communicate, i.e. to the frequency of the subcarrier of back modulation. An advantage is that it reduces the flicker noise due to the card activation. Another advantage is that this allows use of the reader/writer receiver of the terminal to perform the low power card detection.

The respective outputs of the chopper circuit 31 are put in form by buffer circuits 53I and 53Q before being applied at input of a reader receiver 60 of the reader. Such a reader/writer receiver 6o corresponds to the data processing circuit used by the device when in active mode. Conventionally, the receiver 6o comprises an analog part 61 (ANALOG), a digital part 63 (DIGITAL) and an analog to digital converter 62 (ADC) between them. The analog part 61 comprises, amongst others, analog filters 615 (FILTER). These filters are usually centered on a frequency lower than the carrier of 13.56 MHz. As a specific example, filters 615 are centered on a frequency of 848 kHz, which corresponds to the frequency of the back modulation. The filters 615 amplify the useful signal while rejecting the noise during the low power card detection mode. The digital part 63 comprises, amongst others, a processing unit (PU), a memory (MEM), and circuits used for the communication between a reader and a card.

According to an alternative embodiment, the signals provided by the chopper 51 at the frequency f are measured by analog or digital peak detectors.

An advantage of the disclosed embodiments is that, thanks to the use of DC cancellation (and chopping), it is possible to take advantage of the sensitivity of the reader/writer receiver, which is used in normal operation. Doing so, the sensitivity of the low power card detection is in line with the sensitivity of the reader/writer operation.

Furthermore, the disclosed embodiments are compliant with a reduction of the detection bursts (P, FIG. 4) in order to reduce the power consumption during the low power card detection phases.

Various embodiments and variants have been described. Those skilled in the art will understand that certain features of these embodiments can be combined, and other variants will readily occur to those skilled in the art. In particular, the choice of the frequencies used for the chopping amplifiers depends on the frequency of the filters of the de-chopping filters.

Finally, the practical implementation of the embodiments and variants described herein is within the capabilities of those skilled in the art based on the functional description provided hereinabove.

What is claimed is:

1. A circuit comprising:
   an in-phase/quadrature down converter configured to be coupled to an antenna of a first NFC (near field communication) device;
   DC (direct current) cancellation circuitry coupled at outputs of the in-phase/quadrature down converter; and
   detection circuitry configured to analyze DC signals output by the DC cancellation circuitry to detect the presence of a second NFC device, the detection circuitry comprising:
      amplifiers coupled to receive DC signals from the DC cancellation circuitry,
      an analog to digital converter coupled to receive amplified signals from the amplifiers, and
      a digital signal processing unit coupled to receive digital signals from the analog to digital converter.

2. The circuit according to claim 1, further comprising low pass filters between the converter and the DC cancellation circuitry.

3. The circuit according to claim 1, wherein the DC cancellation circuitry is configured by the detection circuitry, based on DC levels indicative of no second NFC device being present in a field generated by the first NFC device.

4. The circuit according to claim 1, wherein the digital signals provide information related to the phase and amplitude of a variation of an RF (radio frequencey) signal sensed by the antenna.

5. The circuit according to claim 1, further comprising the antenna and a front end circuit coupled between the antenna and the converter.

6. A method comprising:
   emitting an electromagnetic field by a first NFC device;
   sensing an RF signal at an antenna located in the electromagnetic field in response to a change in the electromagnetic field;
   converting the RF signal into in-phase and quadrature signals;
   performing DC cancellation of the in-phase and quadrature signals; and
   detecting the presence of a second NFC device by analyzing DC signals resulting from the DC cancellation, wherein the emitting, sensing, converting, DC cancellation, and detecting steps are performed periodically.

7. The method according to claim 6, further comprising low pass filtering the in-phase and quadrature signals.

8. The method according to claim 6, wherein the DC cancellation removes DC levels measured when no second NFC device is present in the electromagnetic field.

9. The method according to claim 6, wherein analyzing the DC signals is performed by a receiver of the first NFC device.

10. The method according to claim 6, wherein a time taken for the sensing, converting, DC cancellation, and detecting steps is small compared to a time between successive emitting steps.

11. The method according to claim 6, wherein the first NFC device is in a standby mode between two successive emitting steps.

12. The method according to claim 6, further comprising initiating, by the first NFC device, a near field communication with the second NFC device in response to a detection of the presence of the second NFC device in a range of the first NFC device.

13. A near field communication (NFC) device, comprising:
   a resonant circuit configured to generate an electromagnetic field;

a field detection circuit configured to sense an RF signal in response to a change in the electromagnetic field;
a processor; and
a non-transitory computer-readable storage medium storing a program to be executed by the processor, the program including instructions for implementing a method of:
converting the RF signal into in-phase and quadrature signals;
performing DC cancellation of the in-phase and quadrature signals; and
detecting the presence of a second NFC device by analyzing DC signals resulting from the DC cancellation, wherein the generating, sensing, converting, DC cancellation, and detecting are performed periodically.

14. The NFC device according to claim 13, wherein the analyzing comprises detecting a change in a phase of the electromagnetic field, an amplitude of the electromagnetic field, or a combination thereof.

15. The NFC device according to claim 13, wherein the method further comprises low pass filtering the in-phase and quadrature signals.

16. The NFC device according to claim 13, wherein the DC cancellation removes DC levels indicative of no second NFC device being present in the electromagnetic field.

17. The NFC device according to claim 13, wherein the method further comprises initiating a near field communication with the second NFC device in response to a detection of the presence of the second NFC device.

18. The device according to claim 13, wherein a time taken for the sensing, converting, DC cancellation, and detecting steps is small compared to a time between successive generating steps.

19. A circuit comprising:
an in-phase/quadrature (IQ) down-converter configured to be coupled to an antenna of a first NFC (near field communication) device;
DC cancellation circuitry coupled at outputs of the IQ down-converter; and
detection circuitry configured to analyze DC signals output by the DC cancellation circuitry to detect the presence of a second NFC device, the detection circuitry comprising:
a chopping circuit coupled to receive DC signals from the DC cancellation circuitry, and
a reader/writer receiver of the first NFC device.

20. The circuit of claim 19, wherein a frequency of the chopping circuit corresponds to a frequency of filters of the reader/writer receiver.

21. The circuit of claim 19, wherein the analyzing comprises detecting a change in a phase of the electromagnetic field, an amplitude of the electromagnetic field, or a combination thereof.

* * * * *

UNITED STATES PATENT AND TRADEMARK OFFICE
CERTIFICATE OF CORRECTION

PATENT NO. : 11,228,344 B2
APPLICATION NO. : 16/702902
DATED : January 18, 2022
INVENTOR(S) : Jernej Rozman et al.

Page 1 of 1

It is certified that error appears in the above-identified patent and that said Letters Patent is hereby corrected as shown below:

In the Claims

Claim 4, Column 8, Line 27; delete "frequencey" and insert --frequency--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*